United States Patent [19]

Krawchuk et al.

[11] Patent Number: 5,570,739
[45] Date of Patent: Nov. 5, 1996

[54] ANTI-VIBRATION SPACERS USED IN TUBULAR TYPE HEAT EXCHANGERS

[75] Inventors: Myron T. Krawchuk, Newton; Alexander Girshik, Fair Lawn, both of N.J.

[73] Assignee: Foster Wheeler Development Corporation, Livingston, N.J.

[21] Appl. No.: 350,575

[22] Filed: Dec. 7, 1994

[51] Int. Cl.$^6$ ............................................. F28F 7/00
[52] U.S. Cl. ................................. 165/69; 165/162
[58] Field of Search ............................. 165/162, 69, 32; 122/510

[56] References Cited

U.S. PATENT DOCUMENTS

| | | | |
|---|---|---|---|
| 2,641,021 | 6/1953 | Wikle et al. | 18/2 |
| 3,820,594 | 6/1974 | Ritland et al. | 165/69 |
| 4,359,088 | 11/1982 | Jabsen | 165/162 X |
| 4,637,435 | 1/1987 | Stewart et al. | 165/76 X |
| 4,637,455 | 1/1987 | Tordonato | 122/510 |
| 4,653,575 | 3/1987 | Lagally | 165/69 |
| 4,789,028 | 12/1988 | Gowda et al. | 165/162 |
| 4,893,671 | 2/1990 | Lagally et al. | 165/162 |
| 4,917,172 | 4/1990 | Falduti | 165/69 X |
| 4,991,645 | 2/1991 | Lagally et al. | 165/69 |
| 5,072,786 | 12/1991 | Wachter | 165/69 |

FOREIGN PATENT DOCUMENTS

| | | | |
|---|---|---|---|
| 59-12293 | 1/1984 | Japan . | |
| 3-129196 | 6/1991 | Japan | 165/69 |
| 861921 | 12/1979 | U.S.S.R. . | |

*Primary Examiner*—John Rivell
*Assistant Examiner*—Christopher Atkinson
*Attorney, Agent, or Firm*—Martin Smolowitz

[57] ABSTRACT

Anti-vibration spacer elements are located between adjacent elongated heat exchanger tubes for operation at temperatures above ambient in a tubular type heat exchanger. The spacer elements are formed of metal alloys having a shape-memory characteristic and are placed between adjacent rows of elongated tubes in the heat exchanger, such as a steam generator or feed water heater, and are supported from a girth ring in the casing of the heat exchanger. When the heat exchanger operating temperature is increased above a transition temperature (TT) for the spacer metal, such as a temperature between −100° F. and 1000° F., the spacer element increases in its overall effective thickness dimension so as to provide a lateral loading force against the adjacent tube pairs, and thereby dampen and prevent undesired vibrations of the elongated tubes. The invention also provides a method for providing vibration dampening for elongated tubes in heat exchangers operating at −100° to 1000° F.

8 Claims, 3 Drawing Sheets

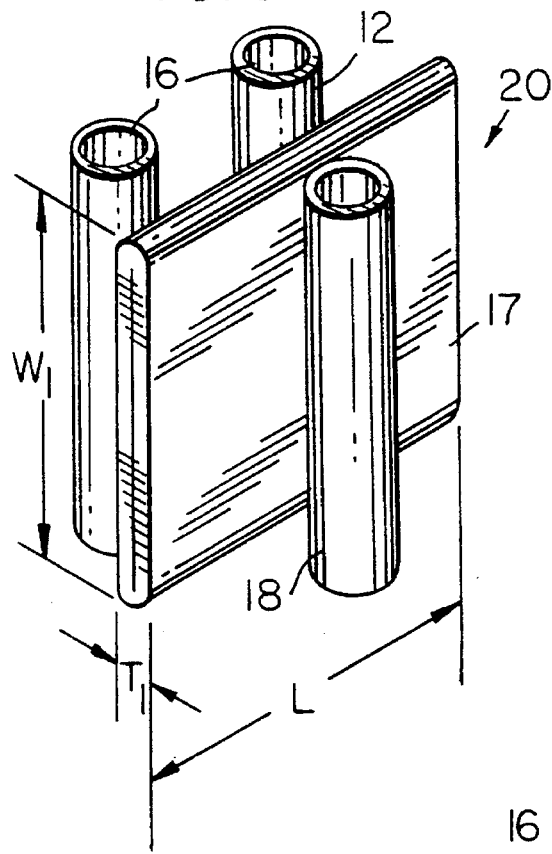
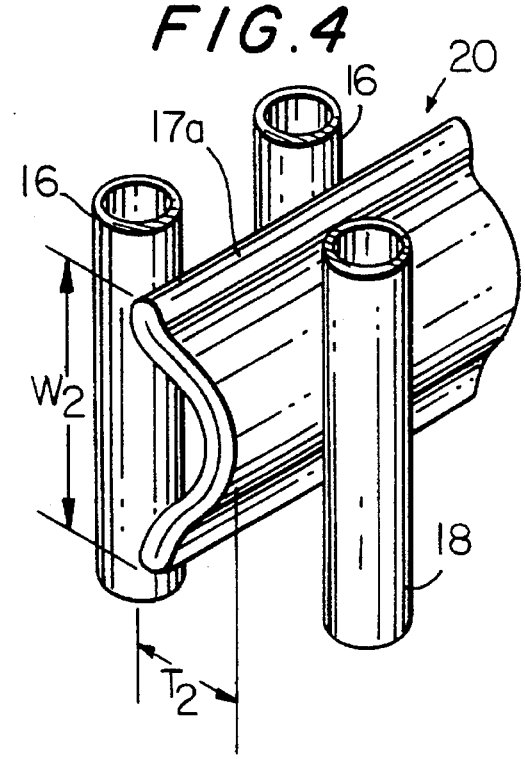
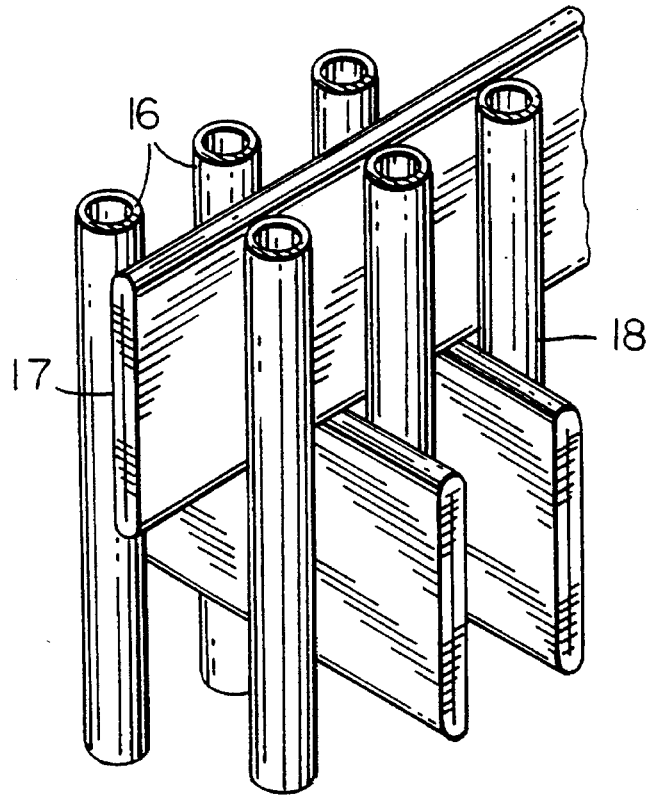

ANTI-VIBRATION SPACERS USED IN TUBULAR TYPE HEAT EXCHANGERS

BACKGROUND OF INVENTION

This invention pertains to anti-vibration spacers formed of shape memory metals (SMM), and adapted for vibration dampening for elongated tubes in tubular type heat exchangers operating at various temperature levels.

For tubular type heat exchangers containing elongated tube bundles, undesired vibration of the tubes which are not adequately supported can occur during operations. Such undesired vibration can be self-induced by flowing fluids circulating at high velocities in or past the tubes, or such vibrations can occur because the heat exchangers are located near reciprocating or rotating machinery such as compressors and pumps which induce the vibrations. Such tube vibration can cause metal fatigue and tube failures, which can result in undesired plant outages and expensive repairs.

The general use of expandable type anti-vibration spacer bars in tubular type steam generators is known, having been disclosed in U.S. Pat. No. 4,653,576 to Legally. Such expandable anti-vibration bars are positioned between columns of tubes in a steam generator and utilize relative movement between mating bar halves to increase overall thickness of the bars by suitable mechanical take-up means. U.S. Pat. No. 4,789,028 to Gowda et al discloses pressurizable anti-vibration bars used between adjacent rows of tubes in tube bundles carrying a high temperature coolant in a steam generator, which bars increase in width upon being pressurized. U.S. Pat. Nos. 4,893,671 and 4,991,645 to Legally disclose specific arrangements for anti-vibration bars used in a bundle of U-shaped tubes in a steam generator, in which mating pairs of bars utilize either relative movement of bar halves or quarter-turn rotation of rectangular-shaped bars to increase the effective width of the bar. However, because such known anti-vibration bar configurations are complicated and somewhat unreliable, further needed improvements have been sought and are being provided by the present invention. Also, U.S. Pat. No. 4,637,436 to Stewart, Jr. et al discloses an annular tube-like driver formed of a shape-memory alloy for insertion into a tube to plug the tube. However, the prior art evidently has not provided tube spacers formed of shape-memory metal alloy materials which expand at particular operating temperatures and thereby load and dampen vibrations of tubes in heat exchanger.

SUMMARY OF INVENTION

This invention provides anti-vibration spacers used in tubular type heat exchangers, which spacers are temperature sensitive and adapted for installation between adjacent tubes or rows of elongated tubes in the heat exchangers. The invention utilizes the ability of certain metals or metal alloys having shape-memory characteristics to undergo a phase change and accompanying dimensional change from a martensite state to an austenite state at a selected transition temperature (TT) for the metal. The spacer elements are initially supported and retained in place between the tube rows by any suitable means, such as by a girth ring provided around a bundle of the tubes.

Selection of the particular shape-memory metal (SMM), its transition and operating temperature, and the heat treatment process for the anti-vibration spacers will depend on the specific design requirements for their installation in a tubular heat exchanger. These requirements include compatibility with the heat exchanger materials and corrosiveness of the fluid medium which will contact the shape memory metal (SMM). The higher the transition temperature (TT), the lower is the amount of energy released through the phase transformation of the spacer metal. The transition temperature affects the amount of shape recovery force provided by the spacer element. In general, the shape-memory metal tends to fully recover its prior memorized shape. The chemical composition and transition temperature for the shape memory mental (SMM) are selected to be appropriate for the desired heat exchanger operating temperature between ambient and about 1000° F. temperature. The spacer elements for this invention are formed of a selected shape memory metal, such as an alloy containing nickel and titanium, or aluminum and manganese in ratios selected to deform at a temperature above a desired transition temperature. If desired, the nickel-titanium alloys may contain small amounts of one or more additive metals such as copper or iron in order to provide desired results. Alternatively, copper alloys which exhibit shape-memory characteristics may be used.

Before its installation, the anti-vibration spacer utilizing a shape-memory metal (SMM) is preshaped to have a desired shape for the spacer element, then it is heat treated and cooled below the critical transition temperature (TT) for the metal. The spacer element is then reshaped to the required initial shape for installation into a particular heat exchanger construction or installation. The reshaped metal spacer element is then installed between adjacent tubes or tube rows of a heat exchanger in which tube vibrations are undesirable and dampening is required. The particular chemical composition of the shape memory metals (SMM) is job specific so that a generalized definition statement cannot cover all design applications. The orientation of the reshaped metal spacers is made generally perpendicular to the tube axis, with a spacer initial support means generally being provided by a girth ring installed in the heat exchanger. Then, when during operation the temperature of the tubes rises above the transition temperature (TT) for the spacer material, the spacer recovers to its previous shape and increases in overall thickness dimension, and acts laterally against the tubes in the heat exchanger to either dampen or prevent undesired vibrations, which could cause premature fatigue failure of the tubes.

The anti-vibration spacer elements which are installed in tubular type heat exchangers utilize their shape-memory characteristic to provide a temperature-sensitive shape change, and are formed initially as bars or plates. The spacer plate initial thickness is slightly less than the gap width between adjacent tubes or rows of tubes in the heat exchanger. These bars are formed by being first preshaped to have a curved or wave shaped cross-section. The preshaped bars are then heat treated and cooled below their transition temperature (TT), so that the metal or alloy is in a martensite metallurgical phase. After that, the spacer bars are reshaped so as to be flat having thickness $T_1$, and are inserted as spacer means between adjacent rows of tubes. During heat exchanger operations when the spacer bars are heated to the heat exchanger operating temperature which is at least 20° F. above the transition temperature of the spacer bars, the martensite phase converts to an austenite phase, thereby causing the spacer bars to recover the initial memorized curved or wave shape having increased overall thickness $T_2$. Such increase in thickness automatically produces an interference fit between the adjacent tube rows, and thereby acts to stabilize the tubes and prevents excessive vibration of tubes in the heat exchanger. The spacer elements should be installed between each adjacent row of tubes and oriented at two different angles so as to support each tube from two different directions.

This invention advantageously utilizes various selected metal alloys having shape memory characteristics to provide the anti-vibration spacers which increase in their total thickness at temperature above a transition temperature for the metal alloy. Such spacers are useful between adjacent rows of tubes in tubular type heat exchangers having straight or U-shaped tubes, particularly for use in large size steam generators, to prevent undesired vibrations from being induced in the tubes. Shaped memory metal (SMM) bars can also be used as a replacement for tube spacer plates in the initial assembly of tubular type heat exchangers.

BRIEF DESCRIPTION OF DRAWINGS

This invention will be further described with reference to the following drawings, in which:

FIG. 3 shows a simplified perspective view of a flat shape memory metal (SMM) spacer plate installed between two adjacent rows of tubes of a heat exchanger unit, the tubes being at a temperature below the metal transition temperature (TT) of the flat spacer;

FIG. 4 shows a simplified perspective view of the shape memory metal (SMM) spacer plate after assuming a curved shape having increased effective thickness $T_2$ at a temperature above the transition temperature (TT) of the metal plate, and providing a lateral anti-vibration force against the tubes;

FIG. 5 shows a perspective view of shape memory metal spacer plates similar to FIG. 3 but installed in two banks at essentially a perpendicular angle to each other and between adjacent rows of the tubes;

DESCRIPTION OF INVENTION

Figure 1:
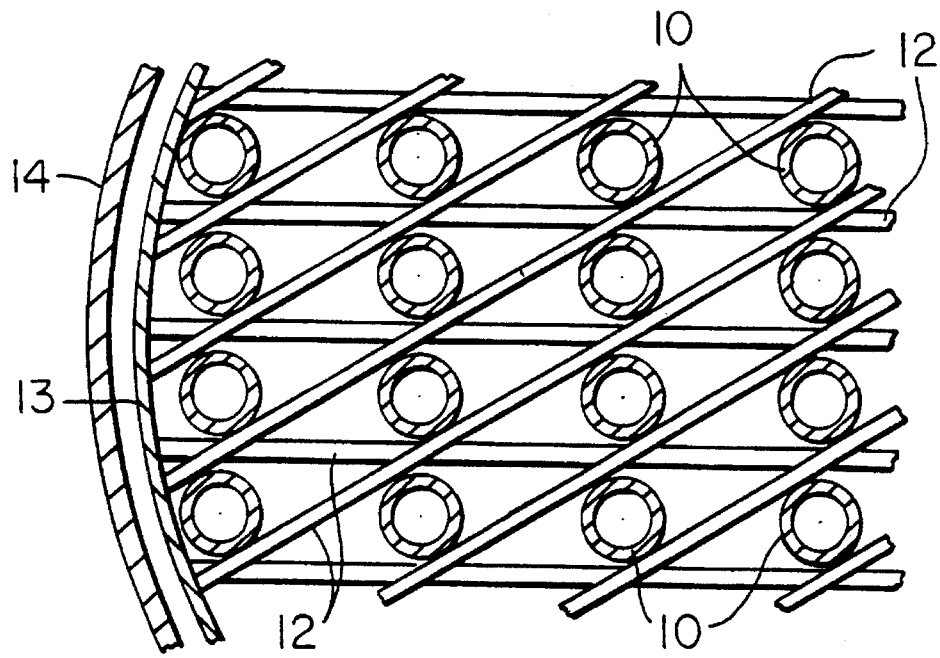
FIG. 1 shows a partial cross-sectional view of tubes of a tubular type heat exchanger which are arranged in a typical square pattern, with spacer plates inserted between adjacent rows of the tubes.
Figure 2:
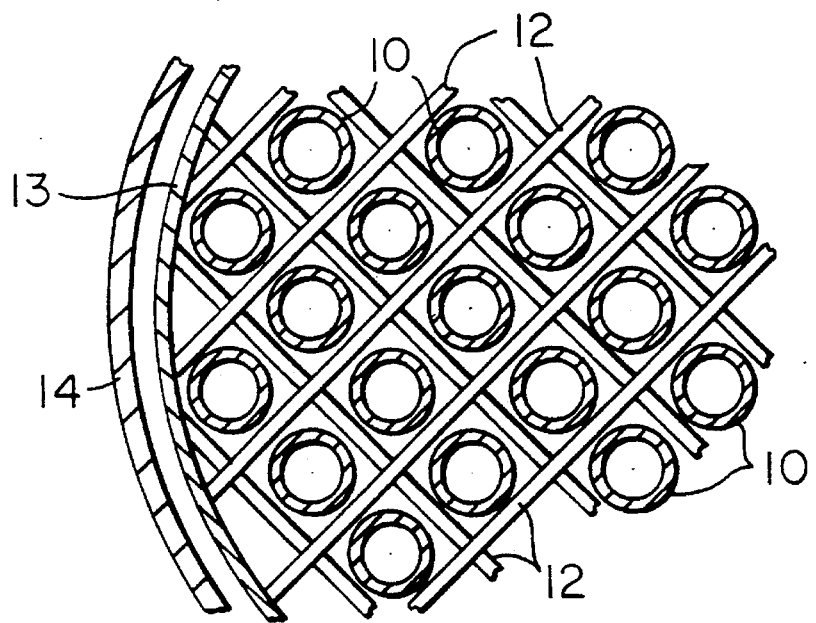
FIG. 2 shows a similar partial cross-sectional view of heat exchanger tubes arranged in a staggered or triangular pitch pattern, with spacer plates being inserted between adjacent rows of the tubes.

For tubular type heat exchangers containing at least two rows and usually up to 100 or more rows of elongated tubes, the tubes 10 are usually arranged in either a square pattern as generally shown by FIG. 1, or arranged in a staggered or are triangular pitch pattern as generally shown in FIG. 2, with the tubes each being equi-spaced apart from an adjacent tube. In either type pattern of the tubes 10, an elongated bar or plate 12 formed of a metal alloy having shape memory characteristics is installed between adjacent rows of the tubes with the plates extending in two different directions, so that the resulting two banks of spacer plates 12 may have an angle of 30°–90° to each other. To retain the spacer plates 12 in place, they can be rigidly attached at either end to a girth ring 13 provided between the tube bundle and the wall 14 of a heat exchanger, as is generally shown in FIGS. 1 and 2.

The elongated tubes and spacer plates are further shown by FIG. 3, in which a heat exchanger unit 20 includes at least two adjacent rows of elongated tubes 16 and 18, which are separated by at least one anti-vibration spacer plate element 17. This spacer plate 17 usually has a flat rectangular shape and is formed of a metal alloy material having a shape memory characteristic, and is installed between the two adjacent elongated tube rows 16 and 18 which are prone to undesirable vibrations under expected operating conditions for the heat exchanger.

During operations, while the spacer plate 17 is maintained at a temperature level below its metal transition temperature (TT), it will be in a martensite metallurgical phase and have a minimum flattened characteristic thickness $T_1$. The spacer plate width $W_1$ will usually be 3–6 times the spacer thickness $T_1$ between the tube adjacent rows, and plate length L will be at least equal to the transverse width of the elongated tube bundle in the heat exchanger unit 20. Because the maximum shape recovery force for the spacer plate 17 is directly related to the spacer thickness, it is usually preferable to have the spacer initial thickness $T_1$ only slightly less by 0.025–0.040 inch than the spacing width between the adjacent tube rows 16 and 18. However, whenever the tubes 16 and 18 and spacer 17 are operated at a temperature above the transition temperature (TT) of the spacer plate 17, the spacer metal will change to an austenite metallurgical phase and plate 17a will assume a curved or wave shape having its longitudinally oriented substantially perpendicular to the tubes so as to have an increased characteristic overall thickness $T_2$, which is greater than its original flattened characteristic thickness $T_1$, as generally shown in FIG. 4. This increased thickness $T_2$ provides a lateral loading force on the adjacent tube rows 16, 18 of the heat exchanger unit 20, which force serves to dampen and minimize any vibrations which are induced in the tubes by fluid flowing across the tubes and/or other vibration inducing causes.

For more effective stabilization of the elongated tubes 10, the shape memory metal spacers 17 should be provided in banks which are oriented generally at 30°–90° angle to each other, as shown in FIG. 5. Each bank of spacers is supported at each end by attachment to a girth ring 13 as generally shown in FIGS. 1 and 2.

Shape memory metals (SMM) useful in this invention are metal alloys having a significant shape-memory characteristic, and include alloys containing nickel and titanium or copper, or aluminum and manganese. The alloy metals are provided in weight ratios conditioned by the desired transitional temperature within a range of −100° F. to 1000° F. and thickness change for the spacer plate and lateral loading required for the tubes, as described above.

The invention is useful for heat exchangers having any tube outside diameters and any tube length. The spacer plates can be installed anywhere along the length of elongated tubes where tube vibrations are likely to occur during operations, which is usually at intermediate locations between tube headers of the heat exchanger.

Figure 6:
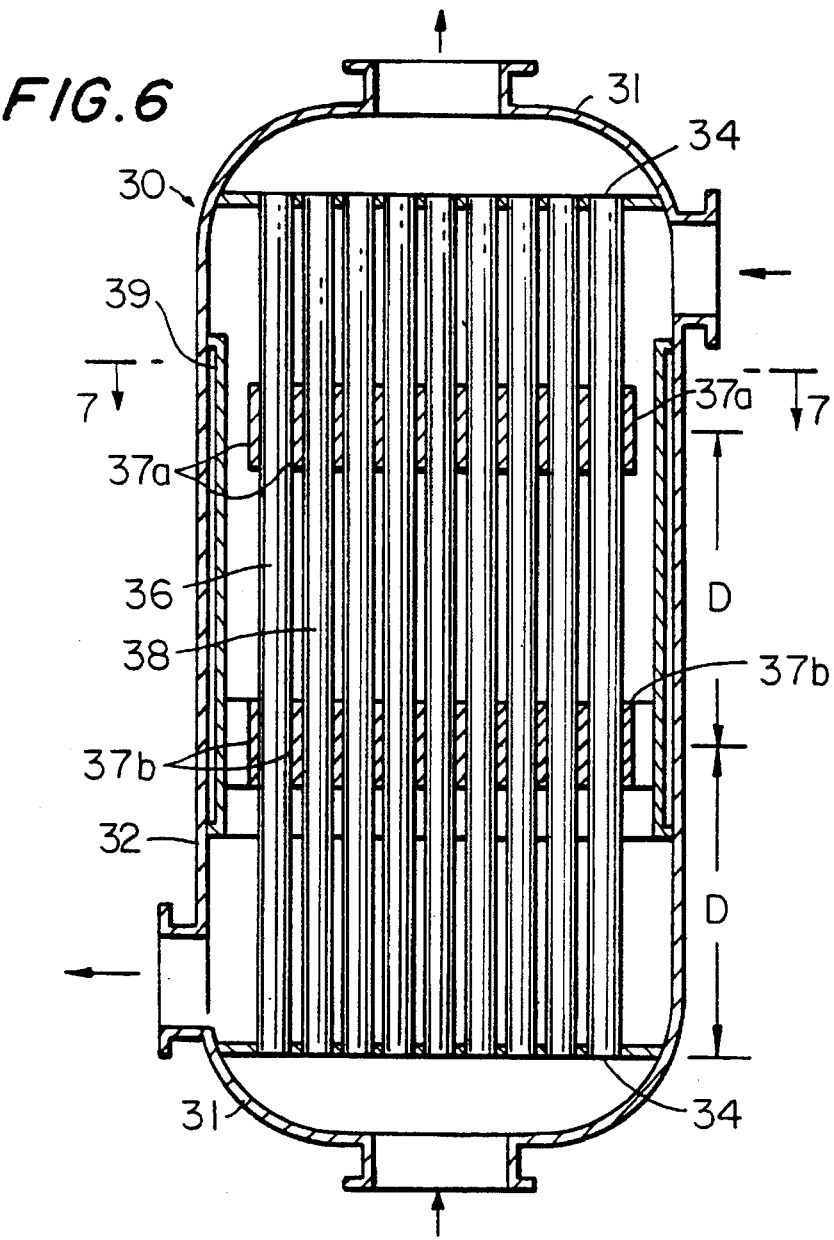
FIG. 6 shows a cross-sectional view of a tubular type heat exchanger having two separate banks of spacer plates installed between adjacent rows of elongated tubes.

A typical shell and tube type heat exchanger 30 having two curved heads 31, an outer casing 32 and dual tube sheets 34 connected by multiple adjacent rows of elongated tubes 36 and 38 is shown in FIG. 6. It is seen that for heat exchangers having long tubes, more than one set of spacers 37a and 37b may be utilized at spaced apart locations along the elongated tube length. The unsupported distance "D" between tubesheet 34 and either spacer set 37a or 37b, or between the spacer sets 37a and 37b is determined by the vibration characteristic of the tubes in adjacent rows 36 and 38, so as to minimize undesired vibrations of the tubes during operations. The spacers 37a and 37b may be supported at their opposite ends by being rigidly attached to a girth ring 39.

Figure 7:
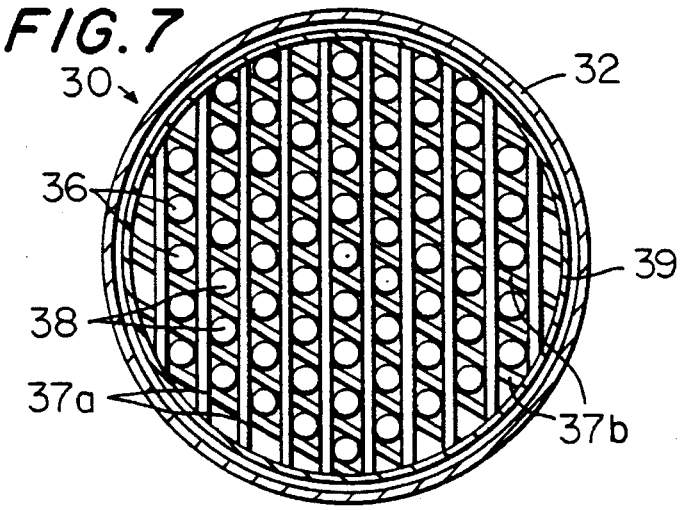
FIG. 7 shows a cross-sectional view taken at line 7—7 of FIG. 6 but showing the spacer plates provided between adjacent rows of the tubes.

A cross-sectional view of the heat exchanger 30 is shown by FIG. 7, in which adjacent tube rows 36 and 38 are separated by spacer plates 37 having ends which are supportably attached to a girth ring 39. The SMM spacer plates 37 are provided at angles of 30°–90° to the tube rows 36 and 38, and are supportably attached at each end 39 to the girth ring 39 such as by welding.

This invention also provides a method for providing vibration dampening for multiple elongated tubes in a heat exchanger. A metal or alloy having a shape-memory characteristic effect is utilized in design of tube anti-vibration spacer structures for heat exchanger units. The flat spacer bars or plates with a memorized corrugated shape are produced and installed generally perpendicular to the tubes longitudinal axis so as to provide tube separation by the spacer bar structure. When the tubular heat exchanger unit is at its operating temperature above the transition temperature (TT) of the spacer bars, the spacers transform to the memorized curved or wave shape, thereby providing lateral loading to the tubes and reducing their tendency for vibration. The method inherently provides tube vibration dampening in both vertical and horizontal directions within the separating spacer plate structure of the heat exchanger.

This invention will now be further described by a typical example of a tube and spacer plate configuration for a heat exchanger, which should not be construed as limiting in scope.

EXAMPLE

A tubular type heat exchanger assembly is constructed having at least three adjacent rows of elongated tubes, with each row being separated by a spacer plate element which is formed of a metal alloy material having a shape-memory characteristic. Significant dimensional and temperature characteristics of the tubular heat exchanger and spacer plates are provided in Table 1 below.

TABLE 1

| | |
|---|---|
| Tube outside diameter, in. | 1.0 |
| Tube length between headers, ft. | 40 |
| Spacing between adjacent rows of tubes, in. | 0.25 |
| Spacer initial thickness in. | 0.20 |
| Transition temperature for spacer, °F. | 350–400 |
| Spacer effective thickness at above its transition temperature without constraint, in. | 0.30 |

When the heat exchanger is operated at a temperature above the transition temperature of the spacer plate material, the spacers undergo a metallurgical and physical change so that the overall effective thickness dimension of the spacers increases sufficient to exert a lateral force on the tubes which dampens any vibrations induced in the tubes.

Although this invention has been described broadly and in terms of a preferred embodiment, it will be understood that modifications and variations can be made to the invention within the scope defined by the claims.

I claim:

1. A tubular type heat exchanger having vibration dampening spacer elements provided between adjacent rows of tubes, comprising,
   (a) at least two pairs of elongated metal tubes, said tube pairs being located adjacent and substantially parallel to but spaced apart from each other, with each tube being attached pressure-tightly at its opposite ends to a tubesheet;
   (b) a pressurizable casing surrounding said tubes; and
   (c) at least two elongated anti-vibration spacer elements installed between said pairs of adjacent tubes and provided in two hanks each oriented 30°–90° angle to each other, said spacer elements being made of a metal alloy having a shape memory characteristic so that the spacer element metal will change from a austenite metallurgical condition to an austenite condition and thereby change its shape at a temperature above a selected transition temperature (TT) for the metal alloy, said spacer elements each having a width $W_1$ which is 3–6 times its initial thickness $T_1$ and a length L at least equal to the transverse width of said tube pairs and being supported within said casing and located between each said pair of adjacent tubes, so that when the temperature of said tubes and said spacer elements are increased above the metal transition temperature for the spacer elements, they will increase in effective thickness from the initial thickness $T_1$ to an increased thickness $T_2$ so as to load said tubes laterally and thereby substantially prevent vibration of the tubes.

2. The tubular heat exchanger according to claim 1, wherein said spacer element is composed of an alloy of nickel and titanium, nickel and copper, or aluminum and manganese in ratios selected so as to deform at a selected transition temperature between −100° F. and 1000° F.

3. The tubular heat exchanger according to claim 1, wherein said elongated spacer elements are pre-shaped to be initially flat having thickness dimensions $T_1$ and change to a wave shape having increased overall thickness $T_2$ at an operating temperature above the selected transition temperature, said spacer element wave shape having its longitudinal axis oriented substantially perpendicular to said tubes.

4. The tubular heat exchanger according to claim 1, wherein said spacer elements are supported an each end from girth ring means provided within said casing.

5. The heat exchanger according to claim 1, wherein said spacer elements are installed in banks oriented at 30°–90° angle to each other between said tubes.

6. The heat exchanger according to claim 1, wherein said anti-vibration spacer elements initial thickness $T_1$ is 0.025–0.040 inch less than the spacing width between said adjacent pairs of tubes.

7. The tubular heat exchanger according to claim 1, wherein said elongated tubes are attached pressure-tightly at each opposite end to said tubesheet which is attached at its periphery to said casing, and said spacer elements are supportably attached at each end to a girth ring.

8. The tubular heat exchanger according to claim 1, wherein said spacer elements are provided in at least two sets which are spaced apart from each other add from said tubesheet by a distance D which is sufficient to minimize undesired vibrations of the elongated tubes.

* * * * *